UNITED STATES PATENT OFFICE 2,641,592

PRODUCTION OF POLYETHYLENE TEREPH-THALATE WITH COBALTOUS ACETATE AS CATALYST

Charles H. Hofrichter, Jr., Madison, Conn., assignor to E. I. du Pont de Nemours & Company, Wilmington, Del., a corporation of Delaware No Drawing. Application July 24, 1951,
Serial No. 238,380

12 Claims. (Cl. 260—75)

This invention relates to an improved method for preparing a synthetic linear polyester which is essentially the condensation product of a dihydric alcohol and a dibasic acid, and more particularly to the preparation of polyethylene terephthalate, a film- and fiber-forming synthetic linear polyester.

The production of the novel class of film- and fiber-forming, linear polyesters of terephthalic acid and a glycol of the series $$HO(CH_2)_nOH$$

where $n$ is an integer from 2 to 10 inclusive, is fully disclosed in U. S. P. 2,465,319 to Whinfield and Dickson. From a commercial standpoint, one of the most attractive polymers of this class is polyethylene terephthalate; and the most promising process for its production comprises carrying out an ester interchange between ethylene glycol and dimethyl terephthalate to form bis-2-hydroxy-ethyl terephthalate monomer which is polymerized to polyethylene terephthalate under reduced pressure and at elevated temperatures.

The above patent discloses a considerable number of catalysts suitable to a varying degree for accelerating the rate of the ester interchange reaction to form bis-2-hydroxy-ethyl terephthalate monomer. Among such catalysts are included sodium, lithium, potassium, calcium, magnesium, zinc, cadmium, and aluminum, as well as alkali metals in the form of their carbonates or other alkaline-reacting salts, for example, the borates; also, the oxides of various of these metals. While these materials are, in general, good catalysts for accelerating the ester interchange reaction, their activity diminishes during the polymerization reaction; and in most instances, it is difficult to secure under acceptable commercial conditions a polyethylene terephthalate of satisfactory quality, i. e., a polymer of high intrinsic viscosity, free of objectionable coloration, and capable of being formed, as by extrusion, into useful filaments and film.

An object of the present invention, therefore, is to provide an improved catalyst for accelerating and controlling the reaction between ethylene glycol and dimethyl terephthalate, and the subsequent polymerization of the resulting product.

Another object is to provide an improved catalyst for accelerating to commercially acceptable rates the ester interchange reaction between ethylene glycol and dimethyl terephthalate, and the subsequent polymerization reaction, without substantial impairment of the color and quality of the polyethylene terephthalate. These and other objects will more clearly appear hereinafter.

The above objects are accomplished according to the present invention by carrying out the ester interchange between ethylene glycol and dimethyl terephthalate, and subsequent polymerization of the resulting bis-2-hydroxy-ethyl terephthalate under super polyester-forming conditions in the presence of a catalytic amount of cobaltous acetate and, preferably, in the presence of a mixture of cobaltous acetate and a compound from the group consisting of litharge and antimony trioxide, each in catalytic amount. The present invention resides in the discovery that cobaltous acetate greatly accelerates the ester interchange and polymerization reaction up to an intrinsic viscosity of 0.7–0.75. Furthermore, the resulting polymer is excellent for extrusion into films and filaments. In producing polymers of intrinsic viscosity above 0.75, the combination of cobaltous acetate with a compound from the group consisting of litharge and antimony trioxide is preferred for rapid reaction and the production of polymer having excellent color.

More particularly, 0.005%–0.15% of cobaltous acetate, based upon the weight of dimethyl terephthalate, is employed, about 0.1% being preferred when used alone, and from 0.005%–0.08% being preferred when used in combination with litharge or antimony trioxide. When used in combination with cobaltous acetate, from 0.01%–0.07% of litharge is preferably employed and from 0.01%–0.10% of antimony trioxide.

The following examples will serve to further illustrate the practice of the present invention. Parts are by weight unless otherwise indicated.

Example I

The following ingredients were introduced into a three-necked reaction flask fitted with a stirrer and a condenser:

| | Parts |
|---|---|
| Dimethyl terephthalate | 1,550 |
| Ethylene glycol | 990 |
| Cobaltous acetate (0.04%, based on the weight of dimethyl terephthalate) | 0.62 |

The ester interchange reaction was carried out over a period of 3¼ hours with continuous removal of methanol at atmospheric pressure. The temperature of the reaction batch was in the range 140°–200° C.

The resulting bis-2-hydroxy-ethyl terephthalate was thereafter introduced into a stainless steel autoclave and heated to a temperature of about 275°. The autoclave was gradually evacuated through an ice trap and a Dry Ice trap over a period of about 1 hour until the pressure was about 5 mm. of mercury. The pressure was further reduced to about 0.5 mm.; and under this full vacuum, polymerization was carried out over a period of 3¼ hours. Thereafter, the vacuum was broken by introducing dry nitrogen into the autoclave. The resulting polyethylene glycol terephthalate had an intrinsic viscosity of about 0.79, and the color of the polymer was classified as grade II on the basis of the following color classification system:

I = water-white.
II = very light amber.
III = light amber.
IV = amber.
V = dark amber.

The expression "intrinsic viscosity" denoted by the symbol $(\eta)_0$ is used herein as a measure of the degree of polymerization of the polyester and may be defined as $$\text{limit } \frac{\ln(\eta_r)}{C} \text{ as } C \text{ approaches } 0$$

wherein $\eta_r$ is the viscosity of a dilute phenol-tetrachlorethane (60:40) solution of the polyester divided by the viscosity of the phenol-tetrachlorethane mixture per se measured in the same units at the same temperature, and C is the concentration in grams of polyester per 100 cc. of solution.

Example II

The general procedure of Example I was repeated except that 1.55 parts of cobaltous acetate (0.1%, based upon the weight of dimethyl terephthalate) was added to the ester interchange reaction vessel. The ester interchange reaction was carried out under the same temperature conditions over a period of 3¼ hours. Polymerization under full vacuum was carried out over a period of 1⅓ hours, and the intrinsic viscosity of the resulting polymer was about 0.77. The color of the polymer was classified as grade II.

Example III

The procedure of Example I was repeated except that 0.465 gram of litharge (0.03%, based upon the weight of dimethyl terephthalate) was added to the ester interchange reactor as the catalyst in place of cobaltous acetate. The ester interchange reaction in which the batch temperature was in the range of 166°–200° C. was carried out over a period of about 3½ hours. Polymerization under full vacuum and under the same temperature conditions as Example I was carried out over a period of 4 hours. The resulting intrinsic viscosity was 0.7 and the color was grade IV.

Example IV

The following ingredients were introduced into a stainless steel batch still equipped with a stirrer and a condenser:

| | Parts |
|---|---|
| Dimethyl terephthalate | 52 |
| Ethylene glycol | 35 |
| Cobaltous acetate (0.03%, based upon the weight of dimethyl terephthalate) | 0.0156 |
| Litharge (0.03%, based upon the weight of dimethyl terephthalate) | 0.0156 |

The ester interchange reaction was carried out over a period of 2¼ hours at atmospheric pressure, and the temperature of the batch was within the range 165°–200° C.

The resulting bis-2-hydroxy-ethyl terephthalate was transferred to a stainless steel autoclave equipped with a stainless steel double helical stirrer which scraped close to the sides of the autoclave. The autoclave was evacuated gradually through an ice trap and a Dry Ice trap while the temperature of the batch was raised to about 275° C. When the pressure in the autoclave was reduced to about 0.5 mm. of mercury, polymerization was carried out for 2⅔ hours at this full vacuum. The intrinsic viscosity of the resulting polymer was 0.72, and the color of the polymer was classified as grade I+.

Example V

The procedure of Example IV was repeated except that 0.0156 part of cobaltous acetate (0.03%, based upon the weight of dimethyl terephthalate) and 0.0260 part of antimony trioxide (0.05%, based upon the weight of dimethyl terephthalate) was added to the batch still.

The ester interchange reaction was carried out over a period of 2¾ hours, and polymerization to obtain a polymer having an intrinsic viscosity of 0.62 took 3¾ hours. The resulting color of the polymer was grade I.

Example VI

The procedure of Example IV was repeated except that the catalyst employed was 0.0156 part of litharge (0.03%). The ester interchange reaction was carried out over a period of 2⅓ hours; and to obtain a polymer having an intrinsic viscosity of 0.7, polymerization took 4¾ hours under full vacuum. The color of the resulting polymer was grade IV.

The foregoing examples are merely illustrative, it being understood that the present invention broadly comprises carrying out an ester interchange and the subsequent polymerization of the resulting bis-2-hydroxy-ethyl terephthalate under super polyester-forming conditions in the presence of a catalytic amount of cobaltous acetate alone or in combination with a compound from the group consisting of litharge and antimony trioxide.

As indicated, dimethyl terephthalate is the preferred ester monomer. However, cobaltous acetate alone or in combination with litharge or antimony trioxide also effectively catalyzes the ester interchange between ethylene glycol and terephthalate esters of saturated aliphatic monohydric alcohols containing up to and including four carbon atoms, e. g., diethyl, dipropyl, and di-isobutyl terephthalates.

The initial condensation may be regarded as essentially a simple ester interchange and may be conveniently carried out at atmospheric pressure and at a temperature range between 140°–220° C., preferably between 150°–200° C. The reaction may be carried out under pressures above or below atmospheric pressure.

As illustrated in the foregoing examples, the polymerization reaction may be effected in the liquid phase, or, as illustrated in U. S. P. 2,534,028, the reaction may be conducted in the solid phase. In the liquid phase, the reaction must be carried out at reduced pressure in the vicinity of 0.05–20 mm. of mercury, 0.05–5.0 mm. being preferred for optimum results. The reduced pressure is necessary to remove the free ethylene glycol which emerges from the polymer as a result of the condensation reaction, since the reaction mixture is very viscous. A temperature between about 230° and 290° C., and preferably between about 260° and 275° C., should be maintained during the polymerization step.

The ester interchange portion of the reaction usually takes from 2 to 4 hours depending upon the size of the batch, 4 to 6 hours usually being required for large scale batch reactions in the neighborhood of 2,000 pounds. The duration of the polymerization cycle depends upon a number of factors; namely, catalyst concentration, temperature, intrinsic viscosity desired, size of the batch of polymer being produced, and the amount of surface area generated in the polymerization autoclave, i. e., the height to which the autoclave is filled and the type and efficiency of the agitator employed. From the standpoint of commercial operation, it is highly desirable not to have too long a polymerization cycle. Furthermore, cobaltous acetate is a highly active polymerization catalyst during polymerization up to an intrinsic viscosity of 0.65–0.75. Consequently, if polymerization is not carried out as rapidly as possible, which means that ethylene glycol is removed rapidly and continuously, cobaltous acetate tends to catalyze various side reactions which result in the formation of excessive color in the resulting polymer. When it is desired to obtain polyethylene glycol terephthalate having an intrinsic viscosity of about 0.75 or below and to obtain a polymer of excellent color, it is preferred that cobaltous acetate be employed alone in a concentration between 0.01% and 0.15%, 0.10% being preferred. Concentrations appreciably below 0.01% are ineffectual in catalyzing the overall polymerization reaction, and concentrations greater than 0.15% tend to promote excessive side reactions during the polymerization cycle, thereby producing discolored polymer.

As mentioned hereinbefore, the removal of ethylene glycol from the polymerization reaction should be as continuous and as rapid as possible to assure rapid polymerization and eliminate the tendency of cobaltous acetate to catalyze undesirable side reactions. To provide for rapid and efficient removal of ethylene glycol, it is highly desirable to conduct polymerization in a vessel which provides for maximum surface area generation. In essence, this means that agitation of the polymerizing mass should provide for the maximum exposure of the polymerizing mass to the effects of the vacuum in order to cause rapid evolution of ethylene glycol from the polymerizing mass. For example, rapid agitation of a batch of polymerizing monomer in an autoclave which is approximately half full causes the polymerizing liquid to splash against the upper walls of the autoclave, thereby exposing a relatively large surface area and effecting rapid evolution of ethylene glycol. This is what is meant by large surface area generation; and any type of equipment which provides for rapid removal of ethylene glycol from the polymerizing mass is highly desirable to prevent the occurrence of side reactions, particularly when using the highly active catalyst combinations of the present invention. In addition to carrying out ester interchange and polymerization in batch reactors, large surface areas may be obtained by employing equipment which provides for continuous ester interchange and polymerization. The present catalyst and combinations thereof with litharge and antimony trioxide are highly useful in continuous reactions.

When used in combination with litharge or antimony trioxide, lesser amounts of cobaltous acetate may be used than when cobaltous acetate is used alone. For example, a combination of 0.03% of cobaltous acetate and 0.03% of litharge is effective for producing polymer having an intrinsic viscosity above 0.75, that is, in the vicinity of 0.75–1.0. Higher intrinsic viscosities may be reached by increasing the amount of each component; but when used in combination, the amount of cobaltous acetate usually should not exceed about 0.07%; and the amount of litharge should not exceed about 0.07%. Considering a combination of 0.03% of each, if the amount of litharge were cut in half, the intrinsic viscosity would level off below 0.75; and by increasing the amount of cobaltous acetate to 0.045% with 0.015% of litharge, the reaction also levels off below 0.75.

When used in combination with antimony trioxide, the amount of cobaltous acetate employed should be between 0.005%–0.05%, and the amount of antimony trioxide employed should be between 0.02% and 0.07%. Such concentrations would be employed to attain an intrinsic viscosity between 0.55–0.75. Polymers of higher intrinsic viscosities may be obtained by increasing the amount of cobaltous acetate to about 0.08%, and the amount of antimony trioxide to about 0.1%.

The intrinsic viscosity desired for a particular polymer mainly depends upon the ultimate use of the polymer and the process of preparing various end products. For example, if film is to be extruded directly from the polymer, the intrinsic viscosity may be as low as 0.55 and is usually between 0.60 and 0.75. If the molten polymer, as it is withdrawn from the polymerization reaction, is cast and subdivided into flake for subsequent extrusion into film, the intrinsic viscosity of the polymer should be between 0.70 and 1.0. This is because there is usually a slight viscosity degradation in subsequent melting and extruding of the flake. Depending upon the particular end use for filaments extruded from polyethylene glycol terephthalate, the intrinsic viscosity will vary from 0.30–1.2.

With cobaltous acetate alone or in combination with litharge or antimony trioxide, polymers which are especially adaptable for extrusion into highly transparent film are readily obtainable. In film form, polyethylene terephthalate may be used in a large variety of applications; and owing to the outstanding strength and toughness of the film, it can be used in calipers as low as 0.00025". On the other hand, the films are transparent and of high clarity in calipers up to 0.005"–0.010". Included among the general and many specific uses for polyethylene terephthalate film are the following: general wrapping and packaging of items such as rice, dried beans, sugar, coffee, fresh produce, soap powders, cement, automobile tires, textiles, greased and untreated machine parts, hardware, gift wrapping etc.; packaging of articles to be sterilized such as medicaments, instruments, chemicals, ointments, gauze, bandages and the like; packaging of foodstuffs which may be heated in the package such as hamburgers, frankfurters, popcorn, etc.; glass replacement for storm, greenhouse and chicken house windows; polarizing film for automobile headlights and windshields; windows for containers and envelopes; transparent cans; container and bottle cap liners; laminations with metal foil to give metallic effects in fabrics; laminations with wood, paper or fabrics for pictures, book covers, wall protectors for around light switches, etc.; wall paper in clear pigmented or printed form; millinery applications, for example, in braid form either alone or laminated to another film of a different color; tare tapes for packages, i. e., cigarette packages; pressure sensitive tapes and adhesive tapes; various electrical applications such as slot insulation for motors, small coils in the form of metal laminations for telephone and radio equipment, primary insulation for heat resistant wire, pressure sensitive electrical tape, split mica insulating tape, i. e., mica sheets laminated between film, small condensers, i. e., metal foil laminated to film, weather resistant electrical wire, i. e., a conductor wrapped with film and coated with asphalt, and wrapping for submerged pipe to insulate against ground currents; sound recording discs, tapes and magnetic tapes; plastic binder for strengthening non-woven fabrics, parting sheets for low pressure laminating; fabric replacement for garment bags, shoulder covers, etc.; tubing for replacing metal tubing in various applications; protective devices such as face shields, goggles, etc.; base film for metalizing by sputtering or other techniques; bacteriostatic applications for inhibiting mold growth, mildew or bacteria growth; and various specific applications such as playing cards, greeting cards, milk bottle hoods, drinking straws, tying ribbon, tracing cloth, display and picnic dishes, disposable protectors against war gases, showcase covers, ground floors for tents, tent windows, printed charts, nomographs and scales, umbrellas, raincoats, file folders, refrigerator bags, tobacco pouches, snare and bass drum heads, tops for convertible automobiles, covers for automobiles in shipment and storage, display card holders, ticker tape, heat shrinkable bands, bottle caps, window shades, etc.

An outstanding advantage of the present invention is that it provides for ester interchange and polymerization reactions at rates which are commercially feasible to produce a polymer which is readily convertible into highly transparent films of excellent physical properties. When cobaltous acetate is used in combination with litharge, the known advantages of employing litharge as a catalyst, as disclosed in U. S. P. 2,534,028 to Izard, are obtained. One of the main advantages is that the resultant polyethylene terephthalates have very low contents of diethylene glycol in the polymeric chains. This is especially advantageous since large quantities of diethylene glycol units materially tend to degrade the physical properties and the chemical stability of the polymeric material.

As many widely different embodiments may be made without departing from either the spirit or scope of my invention, it is to be understood that said invention is in no wise restricted save as set forth in the appended claims.

I claim:

1. In the process for producing filament- and film-forming polyethylene terephthalate wherein ethylene glycol is reacted under ester interchange conditions with an ester of terephthalic acid and a saturated aliphatic monohydric alcohol containing from 1 to 4 carbon atoms, and the resulting glycol terephthalate is polymerized, the improvement which comprises carrying out the polymerization reaction in the presence of catalytic amounts of cobaltous acetate.

2. The process of claim 1 wherein the ester of terephthalic acid is dimethyl terephthalate.

3. The process of claim 2 wherein from 0.01 to 0.15% by weight of cobaltous acetate, based on the weight of dimethyl terephthalate, is used.

4. The process of claim 1 wherein the reaction is carried out in the presence of catalytic amounts of cobaltous acetate and a compound from the group consisting of litharge and antimony trioxide.

5. The process of claim 4 wherein the ester of terephthalic acid is dimethyl terephthalate.

6. The process of claim 5 wherein from 0.03 to 0.08% by weight of cobaltous acetate and from 0.01 to 0.07% by weight of litharge, based on the weight of dimethyl terephthalate, is used.

7. The process of claim 5 wherein from 0.005 to 0.08% by weight of cobaltous acetate and from 0.01 to 0.10% by weight of antimony trioxide, based on the weight of dimethyl terephthalate, is used.

8. A process for producing filament- and film-forming polyethylene terephthalate which comprises reacting ethylene glycol and dimethyl terephthalate in the presence of a catalytic amount of cobaltous acetate at a temperature of from 140° to 220° C. until no further methanol is liberated, and thereafter continuing said reaction in the presence of said cobaltous acetate at a temperature of from 230° to 290° C. and at a pressure of from 0.05 to 20.0 millimeters of mercury, until a fiber-forming linear polyester having an intrinsic viscosity of at least 0.3 is formed.

9. The process of claim 8 wherein cobaltous acetate is the only catalyst, and is used in an amount of about 0.1% by weight based on the weight of dimethyl terephthalate.

10. A process for producing filament- and film-forming polyethylene terephthalate which comprises reacting ethylene glycol and dimethyl terephthalate in the presence of catalytic amounts of cobaltous acetate and a compound from the group consisting of litharge and antimony trioxide as catalysts, at a temperature of from 140° to 220° C. until no further methanol is liberated, and thereafter continuing said reaction in the presence of said catalysts at a temperature of from 230° to 290° C. and at a pressure of from 0.05 to 20.0 millimeters of mercury, until a fiber-forming linear polyester having an intrinsic viscosity of at least 0.3 is formed.

11. The process of claim 10 wherein from 0.03 to 0.08% by weight of cobaltous acetate and from 0.01 to 0.07% by weight of litharge, based on the weight of dimethyl terephthalate, is used.

12. The process of claim 10 wherein from 0.005 to 0.08% by weight of cobaltous acetate and from 0.01 to 0.10% by weight of antimony trioxide, based on the weight of dimethyl terephthalate, is used.

CHARLES H. HOFRICHTER, JR.

No references cited.